United States Patent
Hermans

(10) Patent No.: US 10,828,936 B2
(45) Date of Patent: Nov. 10, 2020

(54) VEHICULAR LADDER

(71) Applicant: IP Reserve Pty Ltd, Clontarf (AU)

(72) Inventor: Ty Gerard Hermans, Margate (AU)

(73) Assignee: IP RESERVE PTY LTD, Queensland (AU)

( * ) Notice: Subject to any disclaimer, the term of this patent is extended or adjusted under 35 U.S.C. 154(b) by 198 days.

(21) Appl. No.: 15/771,954

(22) PCT Filed: Oct. 28, 2016

(86) PCT No.: PCT/AU2016/051014
§ 371 (c)(1),
(2) Date: Apr. 27, 2018

(87) PCT Pub. No.: WO2017/070740
PCT Pub. Date: May 4, 2017

(65) Prior Publication Data
US 2018/0339552 A1  Nov. 29, 2018

(30) Foreign Application Priority Data
Oct. 30, 2015 (AU) ............... 2015904453

(51) Int. Cl.
| | | |
|---|---|---|
| B60B 39/12 | (2006.01) | |
| B60C 27/00 | (2006.01) | |
| B29C 45/14 | (2006.01) | |
| B29K 77/00 | (2006.01) | |
| B29K 681/00 | (2006.01) | |

(52) U.S. Cl.
CPC ........ *B60B 39/12* (2013.01); *B29C 45/14426* (2013.01); *B60C 27/00* (2013.01); *B29K 2077/00* (2013.01); *B29K 2681/04* (2013.01); *B60B 2900/321* (2013.01); *B60B 2900/731* (2013.01)

(58) Field of Classification Search
CPC ... B60B 39/12; B60B 39/00; B29C 45/14426; B60C 27/00
See application file for complete search history.

(56) References Cited

U.S. PATENT DOCUMENTS 3,395,862 A * 8/1968 Lundberg ............... B60B 39/12
238/14
3,836,075 A * 9/1974 Botbol ................... B60B 39/12
238/14

(Continued)

FOREIGN PATENT DOCUMENTS

| AU | 2013206349 A1 | 1/2014 |
|---|---|---|
| AU | 361433 S | 4/2015 |

(Continued)

OTHER PUBLICATIONS

International Preliminary Report on Patentability for App. No. PCT/AU2016/051014, dated Feb. 27, 2018 (7 pages).

(Continued)

*Primary Examiner* — Jason C Smith
(74) *Attorney, Agent, or Firm* — Klarquist Sparkman LLP

(57) ABSTRACT

A vehicular ladder including a body comprising a first plastic and one or more first teeth arranged on the body, wherein the one or more first teeth include a second plastic that is different to the first plastic, and the body is moulded around portions of the one or more first teeth.

13 Claims, 7 Drawing Sheets

(56) References Cited

U.S. PATENT DOCUMENTS

| | | | | |
|---|---|---|---|---|
| 4,133,481 | A * | 1/1979 | Bennett | B60B 39/12 238/14 |
| 4,210,280 | A * | 7/1980 | Reisner | B60B 39/12 238/14 |
| 4,278,203 | A * | 7/1981 | Martin | B60B 39/12 238/14 |
| 4,998,670 | A * | 3/1991 | Peterson | B60B 39/12 238/14 |
| 5,833,136 | A * | 11/1998 | Japp | B60B 39/12 238/14 |
| D464,304 | S * | 10/2002 | Wright | D12/203 |
| 8,231,066 | B2 * | 7/2012 | McCarthy | B60B 39/12 238/14 |
| D829,148 | S * | 9/2018 | Joyce | D12/203 |
| D854,995 | S * | 7/2019 | Dagrossa | D12/203 |
| 2008/0217077 | A1 * | 9/2008 | McCarthy | B60B 39/12 180/9 |
| 2008/0303229 | A1 * | 12/2008 | Bowman | B60P 3/062 280/28 |
| 2017/0100963 | A1 * | 4/2017 | Dagrossa | B60B 39/12 |
| 2017/0174000 | A1 * | 6/2017 | Dagrossa | B60B 39/12 |
| 2018/0339552 | A1 * | 11/2018 | Hermans | B60B 39/12 |
| 2019/0070901 | A1 * | 3/2019 | Otero | B60B 39/12 |

FOREIGN PATENT DOCUMENTS

| | | |
|---|---|---|
| DE | 3811292 A1 | 10/1989 |
| GB | 2019792 | 8/2019 |
| JP | S53145639 U | 11/1978 |
| JP | S62 261503 | 11/1987 |
| WO | WO 85/05597 | 12/1985 |

OTHER PUBLICATIONS

International Search Report and Written Opinion for App. No. PCT/AU2016/051014, dated Nov. 25, 2016 (15 pages).

*Maxtrax Dentistry—tooth replacement* [retrieved from internet on Nov. 22, 2016] (8 pages).

European Examination Report for European Application No. 16858504.0, dated Apr. 22, 2020 (9 pages).

* cited by examiner

VEHICULAR LADDER

CROSS REFERENCE TO RELATED APPLICATIONS

This is the U.S. National Stage of International Application No. PCT/AU2016/051014, filed Oct. 28, 2016, which was published in English under PCT Article 21(2), which in turn claims the benefit of Australian Patent Application No. 2015904453, filed Oct. 30, 2015. Both applications are incorporated herein in their entirety.

FIELD OF THE INVENTION

The invention relates to a vehicular ladder. In particular, the invention relates, but is not limited, to a vehicular ladder for off-road recovery.

BACKGROUND TO THE INVENTION

Reference to background art herein is not to be construed as an admission that such art constitutes common general knowledge in Australia or elsewhere.

Vehicles often lose traction over slippery and/or soft terrain. In the event a vehicle becomes stuck over the slippery and/or soft terrain, recovery devices may be used to assist.

By way of example, vehicle ladders have been used to provide a means of traction by placing the vehicle ladder under one or more wheels of the vehicle. When the vehicle ladder grips the terrain and provides sufficient traction between the one or more wheels, this assists in moving and recovering the vehicle.

Previous vehicle ladders have been directed towards, for example, providing a light weight vehicle ladder. However, these vehicle ladders have not been directed towards, for instance, improving the durability of the gripping teeth and providing further traction to prevent wheel spin and alike that may damage the product and reduce its life. Creating further traction between the vehicle ladder, the terrain and the wheel also improves the likelihood of moving and recovering the vehicle. In addition, an improvement in distributing the stress over a vehicle ladder also improves product life.

OBJECT OF THE INVENTION

It is an aim of this invention to provide a vehicular ladder which overcomes or ameliorates one or more of the disadvantages or problems described above, or which at least provides a useful alternative.

Other preferred objects of the present invention will become apparent from the following description.

SUMMARY OF INVENTION

In one form, although not necessarily the only or broadest form, the invention resides in a vehicular ladder including:
  a body comprising a first plastic; and
  one or more first teeth arranged on the body,
  wherein the one or more first teeth include a second plastic that is different to the first plastic.

Preferably, the first plastic is more flexible compared to the second plastic. Typically, the first plastic has a higher impact resistance compared to the second plastic.

Preferably, the second plastic is more temperature resistant compared to the first plastic. Normally, the second plastic is more abrasion resistant compared to the first plastic.

Preferably, the first plastic includes nylon and/or rubber. Preferably, the first plastic includes PA6 and/or PA66. Normally, PA 6 is known as poly(hexano-6-lactam). Typically, PA66 is known as poly[imino(1,6-dioxohexamethylene) iminohexamethylene]. Preferably, the first plastic is in the form of Ultramid®. Normally, the first plastic is in the form of Ultramid® B3S.

Preferably, the second plastic includes sulfur, glass and/or rubber. Typically, the second plastic is in the form of poly(p-phenylene sulphide). Typically, the second plastic is in the form of Ryton® PPS. Normally, the second plastic is in the form of Ryton® R-4-220NA.

Normally, the body is moulded around portions of the one or more first teeth. In a further form, the one or more first teeth are releasably connected to the body. Typically, the body is integrally formed.

Preferably, the one or more first teeth include a base portion and an upstanding portion. Normally, the base portion includes a step portion. Typically, the body is moulded over the step portion. Normally, the upstanding portion is multifaceted. Preferably, the upstanding portion includes a substantially trapezoidal portion.

Normally, the one or more first teeth include a plurality of first teeth that are connected together. Typically the body is moulded over the connections between the plurality of first teeth.

Typically, the body is elongate. Preferably, the body is arcuate. Preferably, the body is arcuate in a longitudinal direction along the body. Preferably, the body is arcuate from substantially one end of the body to another end of the body.

Preferably, the body includes an upper portion. Preferably, at least the upper portion is arcuate. Preferably, a top face of the upper portion is arcuate. Preferably, the upper portion includes two side portions and a central portion. Normally, recess portions separate the two side portions from the central portion.

Preferably, the central portion includes at least two central parts separated by a central recess. Normally, the central parts include a wave pattern. Preferably, the central portion includes the one or more first teeth.

Preferably, the central recess extends a distance along the body that is substantially the same as one or more of the recess portions. In a further form, the central recess extends a distance along the body that is shorter than one or more of the recess portions. Preferably, a substantially parabolic volume is included between the shorter central recess and longer recess portions to assists in digging earthen material.

Preferably, one end portion of the body is devoid of teeth to assist in digging earthen material. Preferably, the one end portion extends approximately one tenth of the distance along the body. Preferably, the one end portion extends up to a quarter of the distance along the body.

Typically, the vehicular ladder includes one or more second teeth. Normally, the one or more second teeth define a different profile tooth compared to the one or more first teeth. Preferably, the one or more second teeth are elongate.

Normally, the one or more second teeth include an arcuate portion. Preferably, the arcuate portion assists in forming an arcuate profile across the body. Preferably, the arcuate portion is in the form of a concave portion. Preferably, the concave portion assists in forming a concave profile across the body. Typically, the arcuate portion of the one or more second teeth extends along a top edge thereof. Preferably, the arcuate portion extends in a direction towards a longitudinal axis of the body.

Preferably, the one or more second teeth extend in a transverse direction to the longitudinal axis of the body. Normally, the second teeth include a main protrusion. Preferably, the main protrusion is connected to a transverse protrusion. Typically, the main protrusion is angled relatively to the longitudinal axis. Preferably, the transverse protrusion extends substantially parallel to the longitudinal axis. In a further form, the transverse protrusion extends in a direction that is angled to the longitudinal axis.

Normally, the one or more second teeth are located along the two side portions. Typically, the one or more second teeth include a plurality of second teeth that are located at substantially equal distance intervals along the two side portions.

Typically, the one or more second teeth include the first plastic and/or the second plastic. Typically, the one more second teeth having the first plastic are integrally moulded with the body.

Preferably, the body is moulded around portions of the one or more second teeth that include the second plastic. Typically, the one or more second teeth having the second plastic include a base portion and an upstanding portion. Normally, the base portion includes a step portion where the body is moulded over. Typically, the upstanding portion includes the main protrusion and the transverse protrusion.

Normally, the body includes an underside portion. Preferably, the underside portion is defined by the shape of the upper portion.

Typically, the underside portion includes a lower face. Normally, the lower face abuts the recess portions and/or central recess portion. Typically, the lower face includes a plurality of protrusions. Preferably, the plurality of protrusions are substantially cross shape.

Preferably, the body includes a ramp. Preferably, the ramp extends in a downward direction from the upper portion. Normally, the ramp is tapered between the upper portion and the underside portion.

Preferably, the ramp includes a concave portion. Typically, the ramp includes a concave front edge.

Normally, the ramp includes the one or more first teeth. Normally, the one or more first teeth are arranged across the ramp. Typically, the ramp includes the one or more second teeth.

Typically, the ramp includes one or more apertures. Normally, the recess portions include one or more apertures. Preferably, the side portions include one or more pocket portions. Normally, the one or more pocket portions include an aperture therethrough.

Preferably, the body includes a handgrip portion. Typically, at least one of the side portions includes the handgrip portion. Normally, the handgrip portion is between the one or more second teeth. Preferably, the handgrip portion includes one or more protrusions. Preferably, the one or more protrusions taper to a ridge. Preferably, the one or more protrusions include concave side walls.

Preferably, the central recess and/or the recess portions include one or more apertures therein. Preferably, the one or more apertures in the central recess and/or recess portions are configured to receive a mounting bracket that carries the vehicular ladder.

In another form the invention resides in a vehicular ladder including:
a body comprising a first plastic; and
one or more first teeth arranged on the body,
wherein the body is substantially arcuate in a longitudinal direction along the body.

Preferably, the body includes a ramp. Preferably, the ramp extends at a different gradient to that defined by the body forming the arcuate.

Preferably, the body is substantially arcuate from one end of the body to another end of the body.

Preferably, the one or more first teeth include a second plastic that is different to the first plastic.

Preferably, the vehicular ladder is herein as described.

In another form the invention resides in a method for producing a vehicular ladder, the method including the steps of:

placing one or more first teeth into a mould; and
moulding a body comprising a first plastic around the one or more first teeth,
wherein the one or more first teeth include a second plastic that is different to the first plastic.

Preferably, the one or more first teeth include a plurality of first teeth and the step of placing the one or more first teeth into the mould includes arranging the plurality of first teeth along the mould.

Typically, the step of arranging the plurality of first teeth along the mould includes placing each tooth at a predetermined location along a central portion of the mould.

Normally, the step of arranging the plurality of first teeth along the mould includes orientating connections between the plurality of first teeth.

Alternatively, or additionally, the step of arranging the plurality of first teeth along the mould includes placing individual teeth at a predetermined location. Normally, the step of placing individual teeth at the predetermined location includes placing the individual teeth by hand and/or with a robot.

Preferably, the method further includes moulding the body around one or more second teeth.

Typically, the method further includes the step of moulding one or more second teeth with the body.

In another form the invention resides in a method for producing a vehicular ladder, the method including the steps of:

moulding a body comprising a first plastic; and
fixing one or more first teeth comprising a second plastic onto the body.

Normally, the step of moulding the body includes moulding one or more second teeth.

In a further form, the method further includes fixing one or more second teeth comprising the second plastic onto the body.

Further features and advantages of the present invention will become apparent from the following detailed description.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
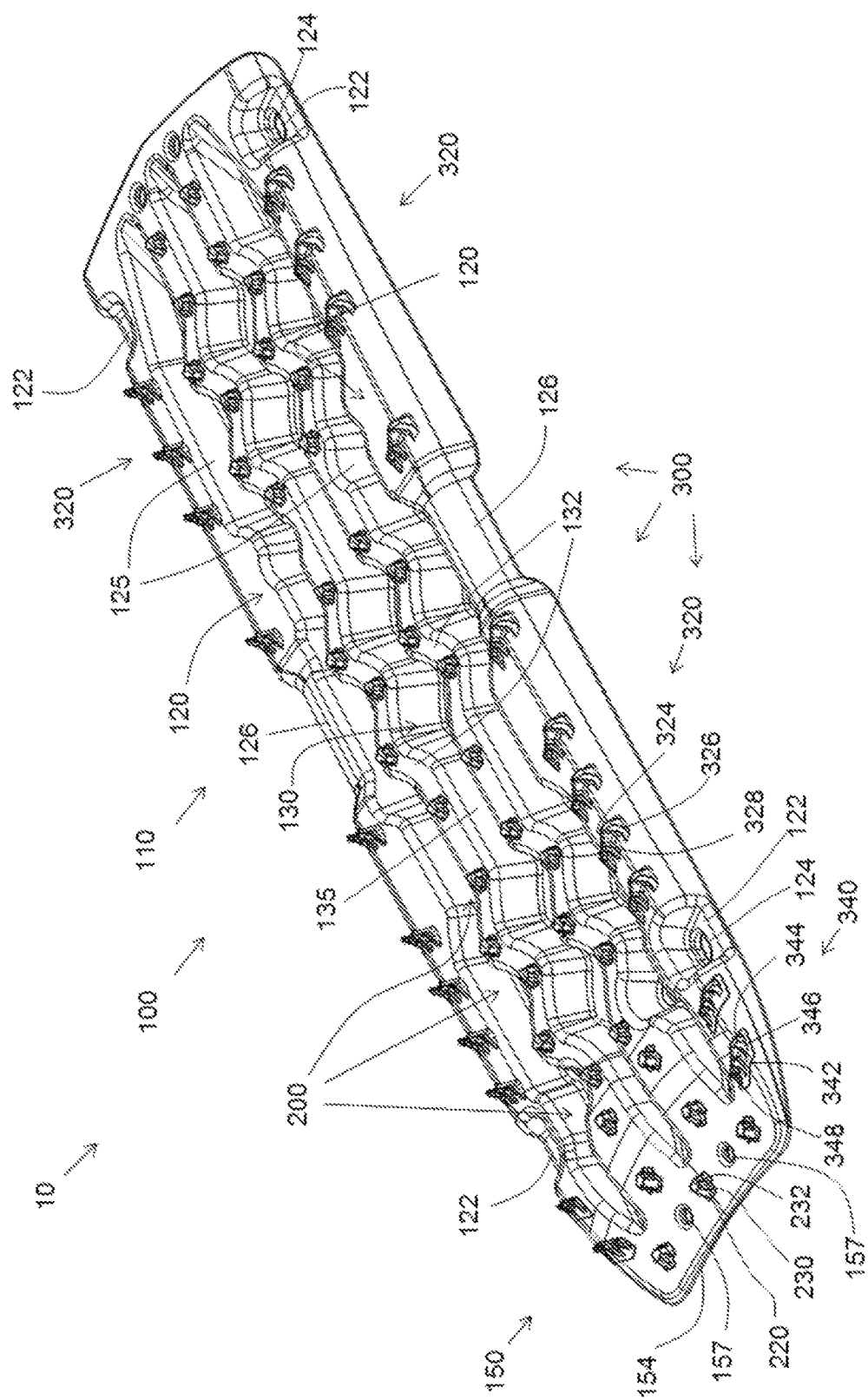
FIG. 1 illustrates a perspective view of a vehicular ladder, according to an embodiment of the invention.
Figure 2:
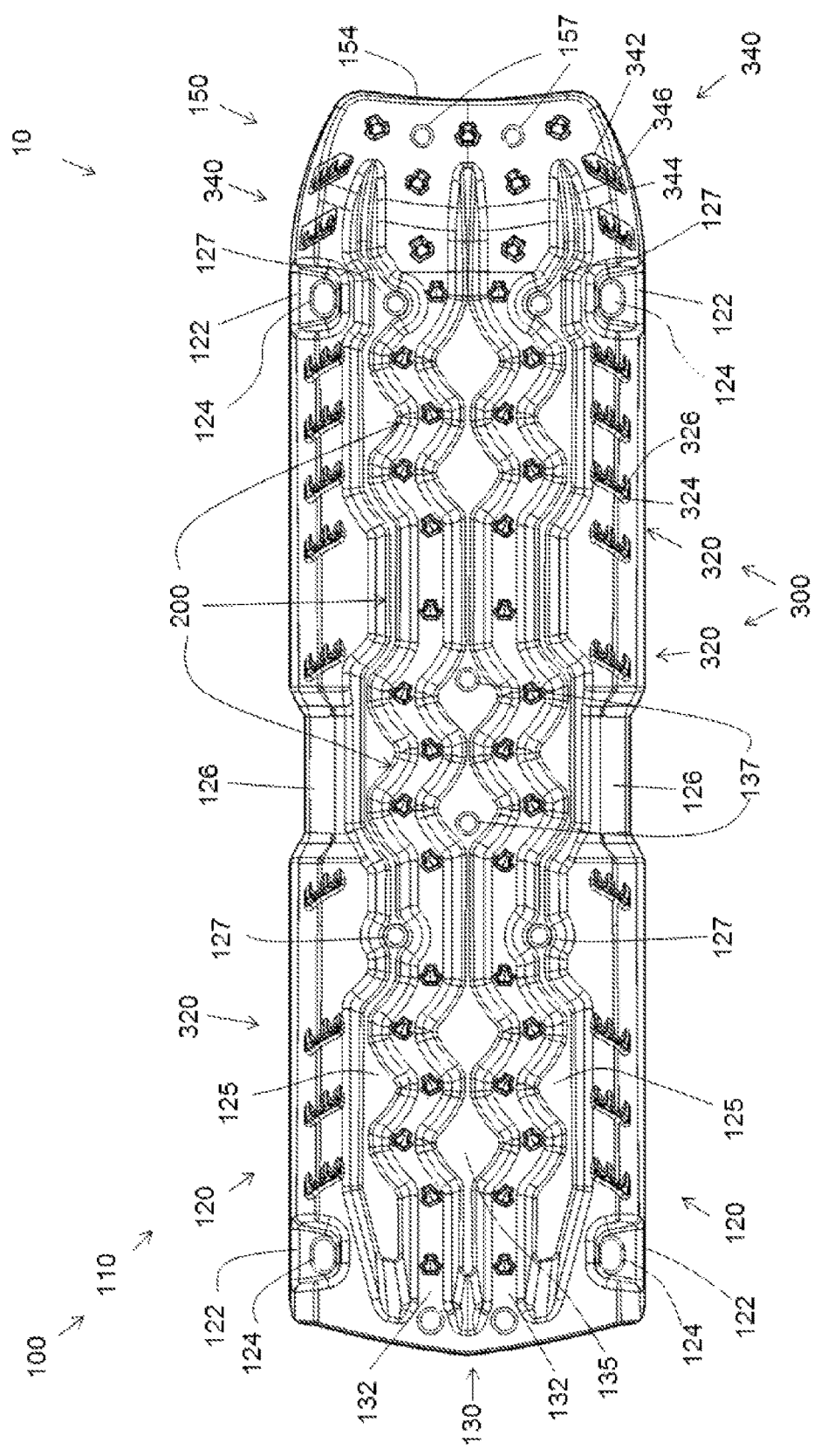
FIG. 2 illustrates a top view of the vehicular ladder shown in FIG. 1.
Figure 3:
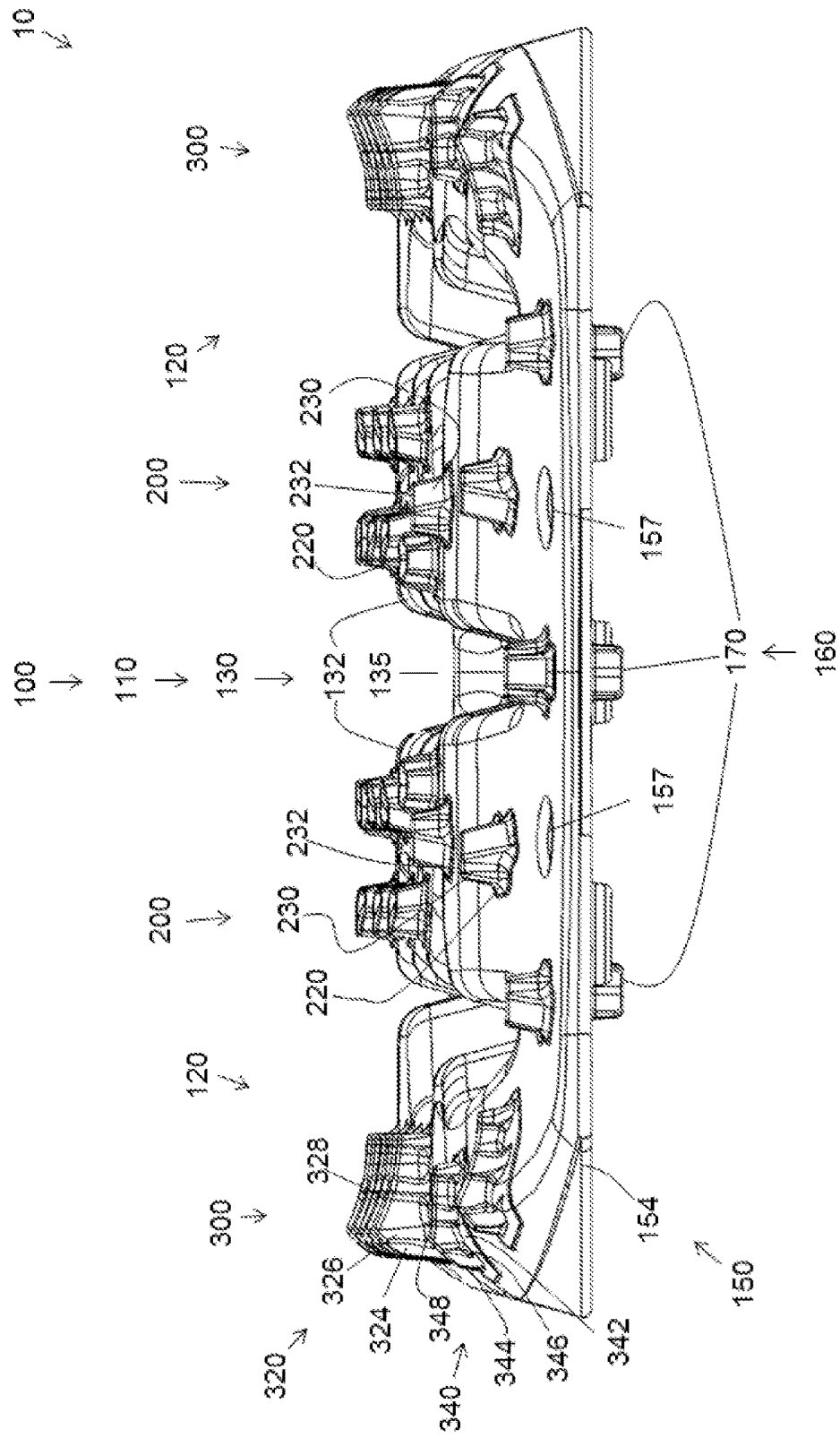
FIG. 3 illustrates a front view of the vehicular ladder shown in FIG. 1.

FIGS. 1 to 3 illustrate a vehicular ladder 10, according to an embodiment of the invention. The vehicular ladder 10 includes a body 100, a plurality of first teeth 200 and a plurality of second teeth 300.

The body 100 includes an upper portion 110 that has two side portions 120 and a central portion 130. The central portion 130 is separated from the side portions 120 by recess portions 125. The recess portions 125 form a channel between the side portions 120 and central portion 130. The recess portions 125 include apertures 127, as shown further in FIG. 2.

The side portions 120 include pocket portions 122. The pocket portions 122 are located near the corner regions of the body 100. The pocket portions 122 each include an aperture 124. The side portions 120 also respectively include a handgrip portion 126. The handgrip portions 126 are located in the middle of the side portions 120. That is, the handgrip portions 126 are located between the pocket portions 122 in a central location along the side portions 120. The handgrip portions 126 include a narrow segment, relative to an upper face of the side portions 120, to assist in holding the handgrip portion 126.

The central portion 130 includes two central parts 132 that are separated by a central recess 135. The central recess 135 includes apertures 137. The central parts 132 include three wave portions spaced apart by two straight portions. The wave portions are moulded such that they oscillate about a longitudinal axis of the central parts 132.

The body 100 includes a ramp 150. The ramp 150 extends in a downward direction from the upper portion 110. The ramp 150 includes a concave portion. In this embodiment, the concave portion is in the form of a concave front edge 154. The concave front edge 154 extends laterally across the body 100. Positioned on the ramp 150 are also apertures 157.

The body 100 also includes an underside portion 160. The underside portion 160 is defined by the shape of the upper portion 110. That is, for example, the central parts 132 of the upper portion 110 define troughs in the underside portion 160 whilst the recess portions 125, 135 define peaks in the underside portion 160. With this in mind, the peaks in the underside portion 160 define a lower surface. This lower surface includes a plurality of protrusions 170. The protrusions 170 extend below the ramp 150. The protrusions 170 are substantially cross-shaped in this embodiment, but it would be appreciated that other shapes may be used.

The body 100 is made of a first plastic in the form of Ultramid® B3S. The body 100 is integrally formed with the first plastic and, as outlined below, includes the first teeth 200 and second teeth 300 thereon.

Figure 4:
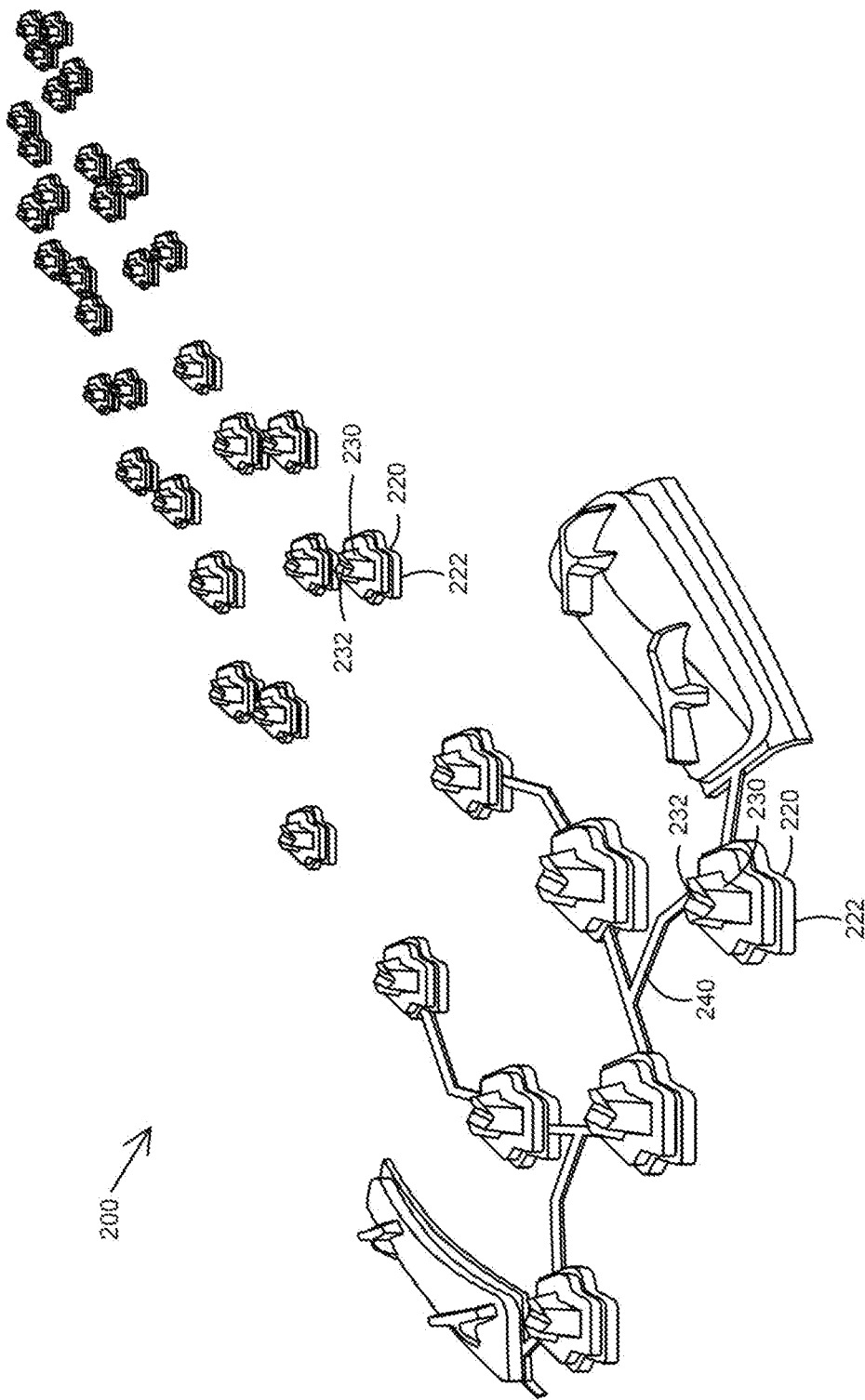
FIG. 4 illustrates a plurality of first teeth, as shown in FIG. 1.

As shown further in FIG. 4, the plurality of first teeth 200 in this embodiment include a base portion 220 and an upstanding portion 230. The base portion 220 includes a step portion 222. The upstanding portion 230 extends upwardly from the base portion 220. The upstanding portion 230 is multifaceted and comprises a substantially trapezoidal shape. The upstanding portion 230 also includes an upper wedged shape edge 232.

The plurality of first teeth 200 are located along the central parts 132 of the body 100 at predetermined locations. The location of the plurality of first teeth 200 are substantially mirrored about the longitudinal axis of the body 100 (i.e. the first teeth 200 are symmetrically located either side of the longitudinal axis of the body 100). The plurality of first teeth 200 are also located along the ramp 150. Similar to the first teeth 200 along the central parts 132, the first teeth 200 along the ramp 150 are mirrored about the longitudinal axis of the body 100.

As can be seen in FIG. 4, the first teeth 200 along the central parts 132 are not connected to adjacent first teeth 200, but it can be appreciated in further embodiments that this feature may be included. The first teeth 200 along the ramp 150 are connected to adjacent first teeth 200 via connectors 240.

The plurality of first teeth 200 are made of a second plastic, which is different to the first plastic included in the body 100. The second plastic is more temperature and abrasion resistant compared to the first plastic. In this regard, the second plastic is harder than the first plastic, which is more flexible and impact resistant. In this embodiment, the second plastic is Ryton® R-4-220NA.

The plurality of first teeth 200 in this embodiment are mould-in teeth. That is, the plurality of first teeth 200 are moulded into the body 100 and protrude therefrom. In this regard, the first plastic of the body 100 is moulded over the step portion 222 to retain the first teeth 200 thereon. The connectors 240 are also covered by the first plastic of the body 100. It would be appreciated that in further embodiments that, for example, the first teeth 200 may be releasably connected to the body 100 with, for instance, a screw-type fastening.

The plurality of second teeth 300 include integral second teeth 320 and moulded-in second teeth 340. The integral second teeth 320 and the mould-in second teeth 340 are substantially the same shape, but the integral second teeth 320 are made of the first plastic whilst the mould-in second teeth 340 are made of the second plastic. With this in mind, the integral second teeth 320, as shown in FIGS. 1 to 3, are integrally formed with the body 100 whilst the mould-in second teeth 340 are moulded thereover by the body 100.

The tooth profile of second teeth 300 is different to the first teeth 200. In particular, the integral second teeth 320 include a main protrusion 324 and a plurality of transverse protrusions 326 extending from the main protrusion 324. It would be appreciated in further embodiments that the plurality of transverse protrusions 326 may be, for example, one protrusion. The main protrusion 324 includes an arcuate upper surface having concave upper edge 328. This concave upper edge 328 assists in forming a concave shape across the body 100.

Similarly, the mould-in second teeth 340 include a main protrusion 344, with a concave upper edge 348, and a plurality of transverse protrusions 346 extending from the main protrusion 344. The mould-in second teeth 340 also include a base portion 342 having step portion (not shown). The body 100 is moulded over the step portion to retain the mould-in second teeth 340 thereon.

The integral second teeth 320 and the mould-in second teeth 340 sit outboard of the first teeth 200. The second teeth 300 are substantially mirrored about the longitudinal axis of the body 100 (i.e. the second teeth 300 are symmetrically located either side of the longitudinal axis of the body 100). The integral second teeth 320 are located along the side portions 120. That is, the integral second teeth 320 substantially form a linear pattern along the side portions 120, adjacent to the handgrip portions 126. It would be appreciated that the mould-in second teeth 320 may replace the integral second teeth 320, in further embodiments.

The mould-in second teeth 340 are located on the ramp 150. In particular, the mould-in second teeth 340 are located forward of the concave front edge 154 along the side regions of the ramp 150. In a preferred embodiment, the mould-in second teeth 340 are connected to the teeth 200 on the ramp 150, outboard thereof.

The second teeth 300 extend substantially in a transverse direction to the longitudinal axis of the body 100. That is, the main protrusions 324, 344 extend in a first direction inclined (i.e. angled) to the longitudinal axis of the body 100. As shown further in FIG. 2, the transverse protrusions 326, 346 extend substantially parallel to the longitudinal axis of the body 100 but, as would be appreciated by a person skilled in the art, the transverse protrusions 326, 346 may be inclined (i.e. angled) to the longitudinal axis.

Figure 5:
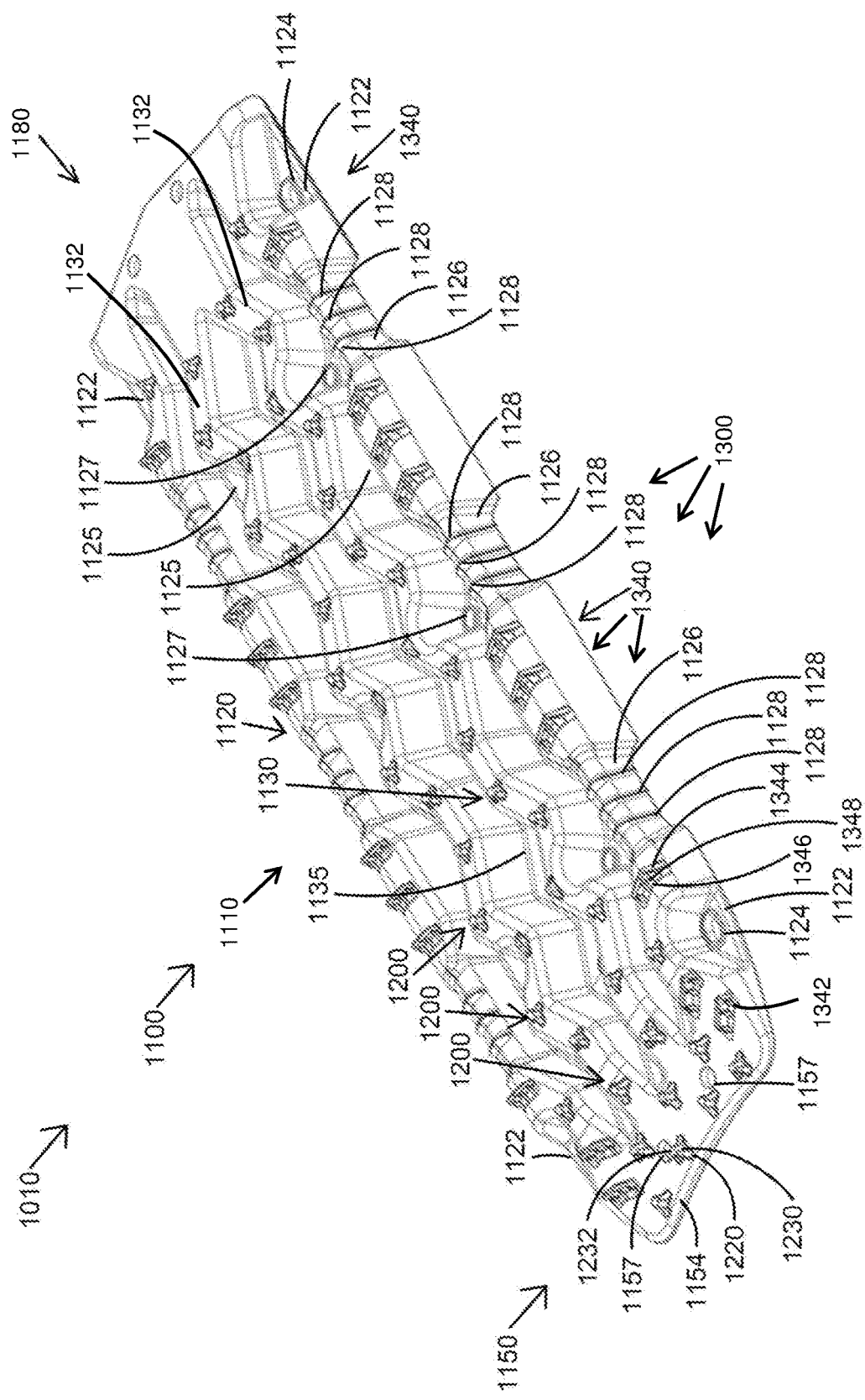
FIG. 5 illustrates a perspective view of a vehicular ladder, according to a further embodiment of the invention.
Figure 6:
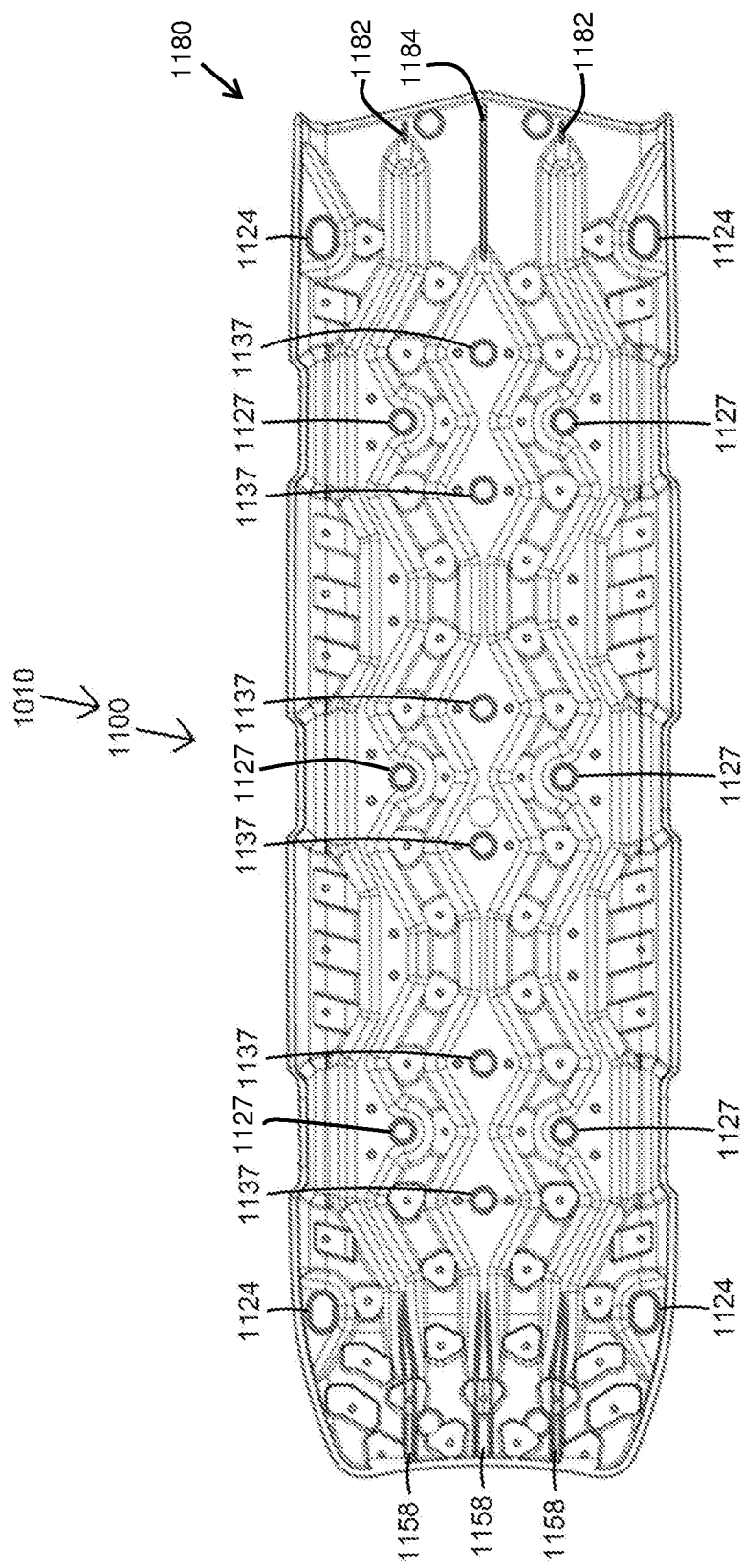
FIG. 6 illustrates a bottom view of the vehicular ladder shown in FIG. 5.
Figure 7:
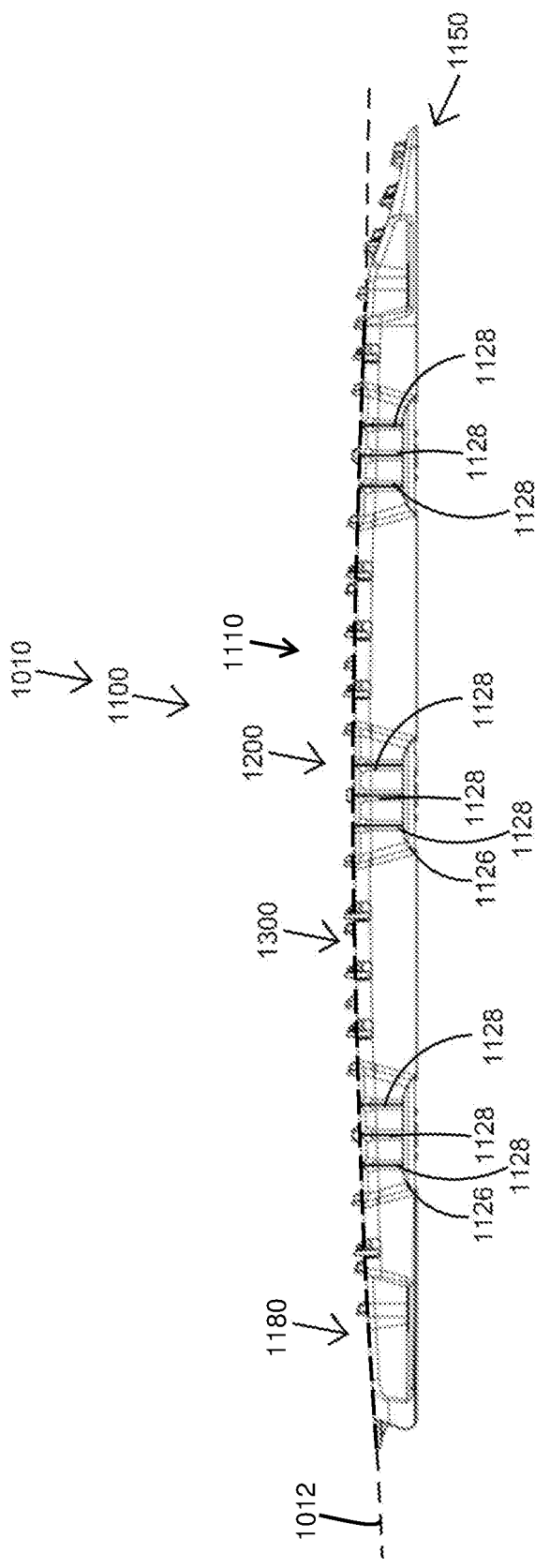
FIG. 7 illustrates a side view of the vehicular ladder shown in FIG. 5.

FIGS. 5 to 7 illustrate a vehicular ladder 1010, according to a further embodiment of the invention. The vehicular ladder 1010 is similar to the vehicular ladder 10 and, therefore, like numbering has been used. However, notable differences between the vehicular ladder 10 and the vehicular ladder 1010 are further noted below.

The vehicular ladder 1010 includes a body 1100, a plurality of first teeth 1200 and a plurality of second teeth 1300. In the same manner as vehicular ladder 10, the body 1100 of vehicular ladder 1010 includes an upper portion 1110 that has two side portions 1120 and a central portion 1130. Recess portions 1125 separate the central portion 1130 from the side portions 1120. A plurality of apertures 1127 extend along the recess portions 1125 to act as mounting points and/or drainage points.

The side portions 1120 include pocket portions 1122. The pocket portions 1122 each include an aperture 1124 that act as, for example, a mounting point when the vehicular ladder 1010 is in use. The side portions 1120 also respectively include handgrip portions 1126. The handgrip portions include a narrow segment, relative to an upper face of the side portions 120, to assist in gripping the handgrip portions 1126. In this embodiment, the handgrip portions 1126 also include one or more protrusions 1128 therefrom that assist in acting as type grips when the vehicular ladder 1010 is in use. The protrusions 1128 include concave side walls that taper to a narrow ridge.

The central portion 1130 includes two central parts 1132 that are separated by a central recess 1135. The central recess 1135 includes apertures 1137. Similar to apertures 1127, the aperture 1137 act as mounting points and/or drainage points. Normally, a number of the apertures 1137 in a middle portion of the body 1100 (in both a lateral and longitudinal direction) are located adjacent to apertures 1127 such that a mounting bracket can be attached in the centre of the vehicular ladder 1010. The apertures 1137, 1127 in the middle portion of the body 1100 substantially form a diamond pattern. In addition, the central recess 1135 in this embodiment extends a shorter distance along the body 1100 in comparison to recess portions 1125. That is, the central recess 1135 does not extend as far along the end portion 1180 in comparison to recess portions 1125. This assists in creating a further suitable volume between recess portions 1125, at the end portion 1180, to help in digging earthen material.

The body 1100 includes a ramp 1150. The ramp 1150 is located at an opposite end to end portion 1180. The ramp 1150 extends in a downward direction from the upper portion 1110. The ramp 1150 includes a concave portion. In this embodiment, the concave portion is in the form of a concave front edge 1154. The concave front edge 1154 extends laterally across the body 1100. Positioned on the ramp 1150 are also apertures 1157.

The body 1100 also includes an underside portion 1160. The underside portion 1160 is defined by the shape of the upper portion 1110. That is, for example, the central parts 1132 of the upper portion 1110 define troughs in the underside portion 1160 whilst the recess portions 1125, 1135 define peaks in the underside portion 1160. As shown further in FIG. 6, ribs 1158 are positioned to assist in stiffening the ramp 1150. At end portion 1160, ribs 1182 extend from the recess portions 1125 to the end of the body 1100. The central recess 1135 has been shortened and rib 1182 extends therefrom to the end of the body 1100.

Like the body 100, the body 1100 is made of a first plastic in the form of Ultramid® B3S. The body 1100 is integrally formed with the first plastic and, as outlined below, includes the first teeth 1200 and second teeth 1300 thereon. As shown further in FIG. 7, the body 1100 is also arcuate in a longitudinal direction thereof. That is, the body 1100 is substantially curved from one end of the body 1100 to the other end of the body 1100 in this further embodiment. The curve is included at least along the upper portion 1110 of the body 1100. This is shown by the arcuate axis 1012 extending along the upper surface of the body 1100.

The plurality of first teeth 1200 include a base portion 1220 and an upstanding portion 1230. The base portion 1220 includes a step portion (not shown). The upstanding portion 1230 extends upwardly from the base portion 1220. The upstanding portion 1230 is multifaceted and comprises a substantially trapezoidal shape. The upstanding portion 230 also includes an upper face 1232 that is substantially planar.

The plurality of first teeth 1200 are located along the central parts 1132 of the body 1100 at predetermined locations. The location of the plurality of first teeth 1200 are substantially mirrored about the longitudinal axis of the body 1100 (i.e. the first teeth 1200 are symmetrically located either side of the longitudinal axis of the body 1100). The plurality of first teeth 1200 are also located along the ramp 1150. Similar to the first teeth 1200 along the central parts 1132, the first teeth 1200 along the ramp 1150 are mirrored about the longitudinal axis of the body 1100.

The plurality of first teeth 1200 are made of a second plastic, which is different to the first plastic included in the body 1100. The second plastic is more temperature and abrasion resistant compared to the first plastic. In this regard, the second plastic is harder than the first plastic, which is more flexible and impact resistant. In this embodiment, the second plastic is Ryton® R-4-220NA.

The plurality of first teeth 1200 are mould-in teeth in this embodiment. That is, the plurality of first teeth 1200 are moulded into the body 1100 and protrude therefrom. In this regard, the first plastic of the body 1100 is moulded over the step portion to retain the first teeth 1200 thereon.

In comparison to the vehicular ladder 10, the plurality of second teeth 1300 in the vehicular ladder 1010 include moulded-in second teeth 1340 only. The mould-in second teeth 1340 are made of the second plastic. The tooth profile of second teeth 1300 is different to the first teeth 1200. In particular, the mould-in second teeth 1340 include a main protrusion 1344, with at least a partially arcuate upper edge 1348, and a plurality of transverse protrusions 1346 extending from the main protrusion 1344. The mould-in second teeth 1340 also include a base portion 1342 having step portion (not shown). The body 1100 is moulded over the step portion to retain the mould-in second teeth 1340 thereon.

The second teeth 1300 are substantially mirrored about the longitudinal axis of the body 1100 (i.e. the second teeth 1300 are symmetrically located either side of the longitudinal axis of the body 1100). The mould-in second teeth 1340 sit outboard of the first teeth 1200. That is, the mould-in second teeth 1340 are located along the side portions 1120. In this regard, the mould-in second teeth 1340 substantially form a linear pattern along the side portions 1120, adjacent to the handgrip portions 1126. The mould-in second teeth 1340 are also located on the ramp 1150. In particular, the mould-in second teeth 1340 are located forward of the concave front edge 1154 along the side regions of the ramp 1150.

The second teeth 1300 extend substantially in a transverse direction to the longitudinal axis of the body 1100. That is, the main protrusions 1344 extend in a first direction inclined (i.e. angled) to the longitudinal axis of the body 100. The transverse protrusions 1346 extend substantially parallel to the longitudinal axis of the body 1100 but, as would be appreciated by a person skilled in the art, the transverse protrusions 1346 may be inclined (i.e. angled) to the longitudinal axis.

The end portion 1180 of the body 1100 assists in forming a shovel on the end of the body 1100. In this regard, the end portion 1180 is devoid of teeth 1200, 1300 to assist help driving the vehicular ladder 1010 into a ground surface when being used as a shovel.

In order to produce the vehicular ladder 10, 1010, the plurality of first teeth 200, 1200 are placed into a mould at predetermined locations. The mould-in second teeth 340, 1340 are also placed into the mould at predetermined locations along the body 100, 1100.

After the above, the body 100, 1100 is moulded around the first teeth 200, 1200 and the mould-in second teeth 340, 1340. In particular, the body 100, 1100 is moulded over the step portion 222, 1222 of the first teeth 200, 1200 and the step portion of the mould-in second teeth 340, 1340. This allows the first teeth 200, 1200 and mould-in second teeth 340, 1340 to be retained on the body 100, 1100.

During the moulding of the body 100, the integral second teeth 320 are formed. In addition, during moulding the body 100, 1100 the other features of the body 100, 1100 (e.g. the side portions 120, 1120, central portions 130, 1130, ramps 150, 1150 etc.) are formed. In further embodiments it can be appreciated that, for example, the body 100, 1100 may first be moulded and then the first teeth 200, 1200 and/or the mould-in teeth 340, 1340 are fixed thereon. In this further embodiment, the first teeth 200, 1200 and/or the mould-in second teeth 340, 1340 may be releasably fixed onto the body 100, 1100.

In response to a vehicle becoming stuck, the concave front edge 154, 1154 of the vehicular ladder 10, 1010 is wedged adjacent to a lower part of a wheel on the terrain. To access the lower part of the wheel, the vehicular ladder 10, 1010 may have to be used as a shovel where, for instance, the end portion 1180 is used as a digging implement. Ideally, a vehicular ladder 10, 1010 is wedged adjacent to each wheel of the vehicle, at a lower part thereof, to recovery the vehicle. To secure the vehicular ladder 10,1010 to the terrain, pegs or alike may be passed through the apertures 124, 127, 157, 1124, 1127, 1157. The underside portion 160, 1160 of the ramp 10, 1010 also engages with the terrain via, for example, the protrusions 170.

Once each vehicular ladder 10, 1010 is in place, the wheels are normally spun in a direction towards the vehicular ladders 10, 1010. This in turn ideally results in: i) each wheel engaging the first teeth 200, 1200; ii) the outside profiled grooves of each wheel engaging the second teeth 300, 1300; and iii) the wheels moving over each vehicular ladder 10, 1010. As the wheels move over each vehicular ladder 10, 1010 the vehicle is normally recovered from its stuck/bogged position.

The body 100,1100 of the first material is more ductile and impact resistant in comparison to the second material. This assists in providing a durable base for the wheels of the vehicle to drive over.

As the wheels generate heat and alike whilst being spun (or rotated) over the vehicular ladders 10, 1010, the first teeth 200, 1200, which bear the bulk of the force from the spinning wheels, are more likely to avoid damage and deformation due to the second plastic being highly temperature and abrasion resistant, relative to the first plastic. This is in turn improves the performance of the vehicular ladder 10,1010 by, for example, maintaining the traction between the wheel and the vehicular ladder 10, 1010.

The second teeth 300, 1300 are profiled in a specific manner (i.e. elongate and concave) to engage with the outside profile grooves of each wheel. The outside profile grooves of different makes of wheels normally have a common denominator. Engagement between the second teeth 300, 1300 and the outside profile groves of each wheel assists in creating traction between the wheel and the vehicular ladder 10, 1010. This is in turn assists in recovering the vehicle.

With the above in mind, it would be appreciated that the arrangement of first teeth 200, 1200 and second teeth 300, 1300 may be designed to cater for different wheels (or tyres). This again will again will assists in creating traction between the wheel and the vehicular ladder 10, 1010 and, therefore, recovering the vehicle.

The concave front edge 154, 1154 assist is following the curved shape of a wheel (i.e. assisting in hugging the shape of an off-road tyre). This again increases the chances of the wheel gripping the vehicular ladder 10, 1010 and the vehicle being recovered.

Other advantages of the vehicular ladder 10, 1010 include the connectors 240, 1240 allowing the first teeth 200, 1200 and, in further embodiment the second teeth 300, 1300 to be placed in a simple grid like fashion in a moulding tool. This reduces the work associated with loading the moulding tool and, therefore, improves efficiency.

The arcuate shape of body 1100, substantially from one end of the vehicular ladder 1010 to the other, also assists in strengthening and distributing stress along the vehicular ladder 1010. The apertures 127, 137, 1127, 1137 and patterns associated therewith assist in forming drainage holes and, for example, mounting a bracket through the middle of the body 1100 for travel purposes. The handgrip portions 126, 1126 assist in carrying the vehicular ladders 10, 1010 and, in the case of handgrip portions 1126, the protrusions 1128 are shaped to assist in gripping a tyre during use. The shovel portion (i.e. end portion 1180) of the vehicular ladder 1010 is also devoid of teeth and the shorten central recess 1135 assists in shovelling earthen material when required.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The invention claimed is:

1. A vehicular ladder including:
  a body comprising a first plastic; and
  one or more first teeth formed separately from the body and arranged on the body;
  one or more second teeth having a different tooth profile compared to the one or more first teeth, said one or more second teeth arranged on the body;
  wherein the one or more first teeth and the one or more second teeth include a second plastic that is different to the first plastic; and
  the body is moulded around portions of the one or more first teeth and one or more second teeth;
  the first plastic, has a higher impact resistance compared to the second plastic; and
  the body including a central portion having at least two central parts separated by a central recess extending longitudinally along the body, the central parts each having a wavy configuration and supporting on an upper surface one or more of the first teeth.

2. The vehicular ladder of claim 1, wherein the body is integrally formed.

3. The vehicular ladder of claim 1, wherein the body includes an upper face that is arcuate in a longitudinal direction along the body.

4. The vehicular ladder of claim 1, wherein the body includes an upper portion having two side portions that are separated from the central portion with one or more recess portions.

5. The vehicular ladder of claim 4, wherein the central recess and/or the one or more recess portions include one or more apertures therein that are configured to receive a mounting bracket.

6. The vehicular ladder of claim 1, wherein the one or more second teeth include an arcuate portion that assists in forming an arcuate profile across the body.

7. The vehicular ladder of claim 1, wherein the body includes a ramp.

8. The vehicular ladder of claim 7, wherein the ramp includes a concave front edge.

9. The vehicular ladder of claim 1, wherein the body includes a handgrip portion having one or more protrusions extending therefrom.

10. The vehicular ladder of claim 9, wherein the one or more protrusions include concave side walls.

11. The vehicular ladder of claim 1, wherein the body is substantially arcuate in a longitudinal direction along the body.

12. The vehicular ladder of claim 11, wherein the body includes a ramp that extends at a different gradient to that defined by the body.

13. A method for producing a vehicular ladder, the method including the steps of:
  placing one or more first teeth into a mould;
  placing one or more second teeth in a mould; and
  moulding a body comprising a first plastic around the one or more first teeth and the one or more second teeth;
  wherein the one or more first teeth and the one or more second teeth include a second plastic that is different to the first plastic; and
  the body has a central portion having at least two central parts separated by a central recess extending longitudinally along the body, the central parts each having a wavy configuration and supporting on an upper surface one or more of the first teeth.

* * * * *